METHOD OF FABRICATING THIN FILM CAPACITORS

Filed Jan. 11, 1967

INVENTOR
Louay E. Sharif
Robert C. Hooper

BY Kenneth R. Glaser
ATTORNEY 3,466,719
METHOD OF FABRICATING THIN FILM CAPACITORS Louay E. Sharif and Robert C. Hooper, Dallas, Tex., assignors to Texas Instruments Incorporated, Dallas, Tex., a corporation of Delaware Filed Jan. 11, 1967, Ser. No. 608,691
Int. Cl. H01g *13/00*
U.S. Cl. 29—25.42 12 Claims

ABSTRACT OF THE DISCLOSURE

Disclosed is a method of forming a thin film capacitor or an insulated crossover in a thin film circuit. A layer of aluminum is deposited on a surface and patterned to form the bottom plate of a capacitor or one conductor in a crossover system and is partially oxidized by immersion in boiling water. Insulation is built up by successive layers of aluminum which are deposited and completely oxidized in turn by immersion in boiling water. A layer of another insulating material is deposited on the final layer of aluminum oxide to prevent absorption of moisture. A final layer of aluminum is deposited upon the multiple layers of insulation and patterned to form either the top capacitor plate or the top conductor of the crossover.

This invention relates to capacitors and more particularly to a method of fabricating thin film capacitors as components of monolithic integrated circuits.

Thin film capacitors fabricated as part of a monolithic integrated circuit are commonly made by depositing such inorganic dielectric materials as silicon oxide ($SiO_2$), aluminum oxide ($Al_2O_3$), tantalum oxide ($Ta_2O_5$), and titanium oxide ($TiO_2$) between thin metal films on the surface of a semiconductor substrate such as silicon. Techniques such as reactive sputtering, evaporation, and thermal decomposition of organo-metal compounds are used to deposit the above-mentioned dielectric materials. Capacitors thus produced are relatively thin, with dielectric thicknesses in the order of a few thousand angstroms. The major problem encountered with very thin layers of these and similar dielectric materials is the presence of voids or pinholes in the layer which often results in a shorted capacitor or power loss at microwave frequencies. The voids are probably caused by the absence of suitable nucleation sites during film deposition and/or the presence of residual stresses in the film following deposition.

In order to eliminate the void and pinhole problem, the dielectric oxide layer has hitherto been formed by anodically oxidizing part of the metal film that forms the bottom plate of the capacitor by the application of a voltage to the film on the substrate while both are in a chemical bath. The anodically formed oxide layer is essentially void free for any void or structural defect in the layer will tend to react first to the electrical action and thereby close the void. However, the anodized layer is difficult to remove by conventional photomasking and etching techniques, and electrical contact to the metal layer to be anodized must be provided. Moreover, the anodization solution containing possible contaminants may contaminate the surface of the layer as well as the junction between the film and the substrate. In addition, capacitors formed by the use of the anodization technique often have low Q's due to the consumption of most of the capacitor bottom plate in the formation of the oxide dielectric. These and other difficulties also arise with the use of insulation layers between interconnecting cross-overs of multilayer integrated circuits.

With these difficulties in mind, it is an object of this invention to provide a method of forming one or more void-free thin film capacitors on the surface of a substrate which are or will be component parts of a monolithic integrated circuit.

Another object of the invention is to provide a method of forming void-free insulation between cross-over interconnections of a monolithic integrated circuit.

The novel features believed to be characteristic of the invention are set forth with particularity in the appended claims. The invention itself, however, as well as further objects and advantages thereof may best be understood by reference to the following detailed description when read in conjunction with the accompanying drawing, wherein:

In brief, the invention involves a method of fabricating a thin film capacitor on a semiconductor substrate to be used for the further fabrication of a monolithic integrated circuit of which said capacitor forms a component. Although it will be obvious from what follows, such a capacitor may be fabricated on a substrate as a single electrical unit for any other purpose that is desired. A bottom capacitor plate is formed on the surface of an insulating layer such as silicon oxide on the substrate by evaporating a relatively thick layer of aluminum and defining the shape of the layer as the capacitor plate by standard photoresist and etch techniques. The substrate is then placed in boiling deionized water for a period of time sufficient to form a thin layer of aluminum oxide on the surface of the aluminum layer. Only a short time in the boiling water is necessary to oxidize the aluminum as the latter will not oxidize further after a thin layer of oxide of about 250 A. in thickness has been formed, the reason being that the oxide layer is relatively non-porous and thereby prevents further oxidation.

Following the formation of the aluminum oxide layer, a thin layer of aluminum, about 250 A. in thickness, is evaporated on the entire surface of the substrate including the oxidized layer on the capacitor bottom plate, after which the substrate is again placed in boiling deionized water for a short period of time sufficient to oxidize all of the second aluminum layer. The aluminum evaporation and oxidation steps are successively repeated until the desired thickness of oxide dielectric is formed.

Since aluminum oxide tends to absorb water, the substrate is placed in a furnace with an air atmosphere and heated at about 400° C. for about one-half hour to evaporate its water content, and thereafter a layer of silicon oxide ($SiO_2$) is applied over the entire surface of the combined aluminum oxide layers to prevent further hydration of said layers. A final layer of aluminum is deposited over the silicon oxide layer as the capacitor top plate. Contacts of both the top and bottom capacitor plates are defined by standard photoresist and etch techniques.

Although any single layer of aluminum oxide may have voids, there are no interconnected voids between the top and bottom plates after successive layers of oxide are built up.

Figure 1:
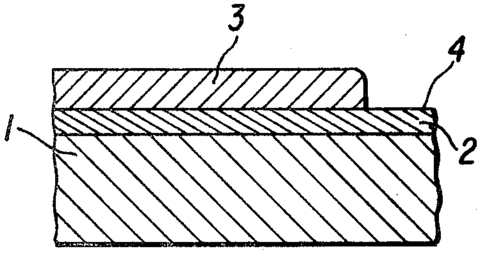
FIGURES 1–7 are sectional views of a portion of an integrated circuit substrate illustrating the fabrication of a thin film capacitor for such a circuit according to the process steps of the invention.

Referring to the drawings, in FIGURE 1 is illustrated a substrate 1, of silicon for example, upon which an insulating layer of silicon oxide 2 for example, is formed by thermally growing or pyrolytically depositing the oxide on the surface of the substrate. The capacitor bottom plate 3 is formed by placing the substrate 1 in a conventional evaporator used in the semiconductor industry and a layer of aluminum 3 (which will also be referred to as the capacitor bottom plate 3 in the drawing) is evaporated on the surface 4 of the oxide layer 2. A layer of photoresist material (not shown) such as KMER, manufactured by Eastman Kodak Company, is placed on the surface 5 of the aluminum layer 3. The photoresist material is patterned to form a mask that exposes the portions of the aluminum layer 3 which are to be removed to define the capacitor bottom plate 3. The mask and exposed portions of the aluminum layer 3 are then subjected to an etching condition for a period of time sufficient to define the bottom plate 3.

Figure 2:
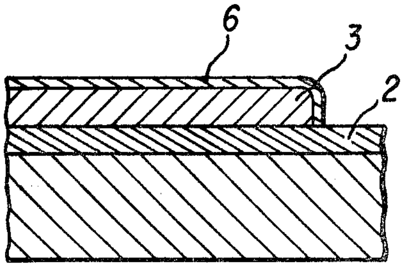

After the mask is removed, the substrate 1 is placed in boiling deionized water for about three to five minutes. A thin layer 6 of aluminum oxide of about 250 A. in thickness is formed from the capacitor bottom plate 3 as shown in FIGURE 2. There is no danger of oxidizing the aluminum layer 3 further since, as previously noted, the oxidation will stop after an oxide thickness of about 250 A. is formed.

Figure 3:
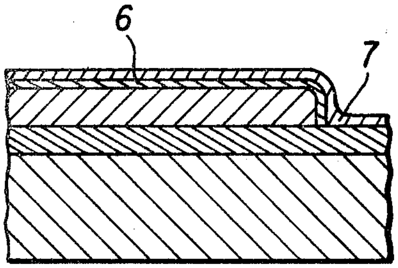

A second layer 7 of aluminum is evaporated on the surface of the substrate including the first oxide layer 6 as shown in FIGURE 3. The thickness of the aluminum layer 7 is about 250 A., so that all of the aluminum will oxidize during the subsequent oxidizing step. The aluminum layer 7 is oxidized by boiling deionized water as previously described.

Figure 4:
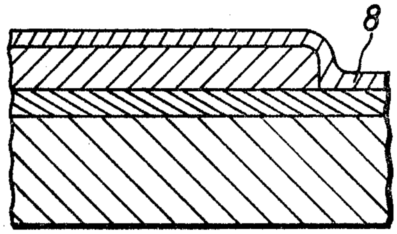

In FIGURE 4 is shown the combined oxide layer 8 which is composed of the oxide layer 6 and the oxidized aluminum layer 7 as described in conjunction with FIGURE 3.

Figure 5:
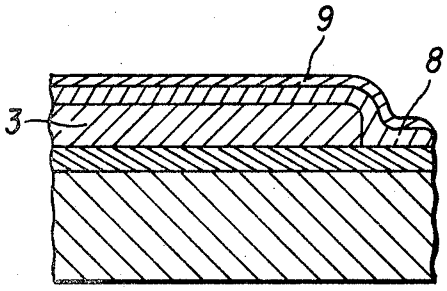

The evaporation and oxidation steps of succeeding aluminum layers are repeated until a sufficient thickness of the aluminum oxide dielectric 8 is built up. Aluminum oxide tends to absorb water and form aluminum hydroxide $Al_2O_3 \cdot H_2O$, which tends to contribute to leakage and instability of the oxide layer. Therefore, the substrate is placed in a furnace for about one-half hour at 400° C. in an air atmosphere to drive off water from the aluminum oxide layer 8. To prevent rehydration, a protective layer of silicon oxide 9 is deposited on the surface of the aluminum oxide layer 8 by any conventional technique such as reactive sputtering as shown in FIGURE 5.

Figure 6:
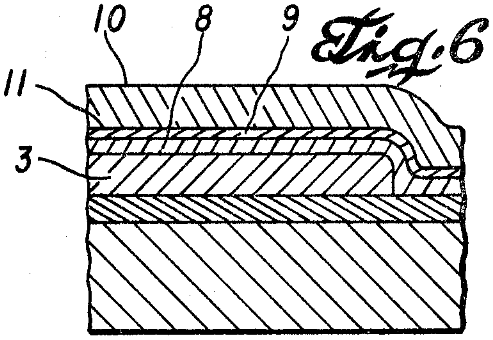

A final layer 10 of aluminum is evaporated on the surface 11 of the silicon oxide layer 9, as shown in FIGURE 6.

Figure 7:
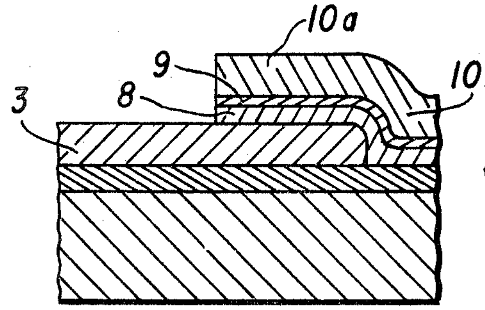

A photoresist mask is formed on the aluminum layer 10 with openings exposing portions of the aluminum layer 10. The mask and exposed portions of the aluminum layer 10 are subjected to an etching condition for a period of time sufficient to define the capacitor top plate 10*a* and top plate contact 10*b*. The combined dielectric layer composed of the aluminum oxide layer 8 and silicon oxide layer 9 which is exposed by the removal of portions of the aluminum layer 10 is subjected to an etching condition for a period of time sufficient to remove all of the exposed layers 8 and 9 as shown in FIGURE 7, thereby exposing the bottom plate contact of the capacitor. The substrate 1 with its thin film capacitor fabricated thereon is now ready for the fabrication of the other components of the monolithic integrated circuit.

Figure 8:
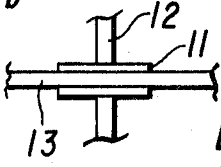
FIGURE 8 is a plan view of a cross-over interconnection of two leads on the surface of a substrate using the dielectric formed by the method of the invention.

The same process steps as previously described for fabricating a thin film capacitor are used to form the required insulation 11 for the cross-over of the interconnections 12 and 13 of an integrated circuit as shown in FIGURE 8.

Although a preferred embodiment of the invention has been described in detail, it is to be understood that various changes, substitutions, and alterations can be made therein without departing from the spirit and scope of the invention as defined by the appended claims. Furthermore, while the process of the invention has been described with reference to the fabricating of a thin film capacitor on a semiconductor substrate, it is evident that such a capacitor may be fabricated on any kind of a substrate, except that, if the substrate is a non-conductor or insulator, such as ceramic, for example, the first step of forming an insulating layer between the surface of the substrate and the bottom plate of the capacitor can be eliminated.

What is claimed is:

1. A method of making a thin film capacitor, comprising the steps of:

(a) depositing a first layer of aluminum on one surface of a substrate;
(b) removing a portion of said first layer of aluminum thereby defining the bottom plate and bottom plate contact of a capacitor;
(c) immersing said substrate including said bottom plate in boiling water for a time sufficient to oxidize the surface of said bottom plate thereby leaving said bottom plate covered with a first layer of oxide;
(d) depositing a second layer of aluminum on said one surface of said substrate including said first layer of oxide;
(e) immersing said substrate including said second layer of aluminum in boiling water for a time sufficient to oxidize all of said second layer of aluminum thereby forming a second layer of oxide;
(f) baking said substrate at about 400° C. in an air atmosphere for about one-half hour;
(g) depositing an insulating layer on said second layer of oxide;
(h) depositing a third layer of aluminum on said insulating layer;
(i) removing a portion of said third layer of aluminum thereby defining the top plate and top plate contact of a capacitor; and
(j) removing the portion of said first and second oxide layers and said insulating layer not covered by said capacitor top plate and top plate contact, thereby uncovering said bottom plate contact.

2. The method as defined in claim 1 wherein said insulating layer is silicon oxide.

3. The method as defined in claim 1 wherein said steps (d) and (e) are repeated as often as necessary to form any desired thickness of oxide.

4. A method of making a thin film capacitor, comprising the steps of:

(a) forming a first insulating layer on one surface of a substrate;
(b) depositing a first layer of aluminum on the surface of said first insulating layer;
(c) removing a portion of said first layer of aluminum thereby defining the bottom plate and bottom plate contact of a capacitor;
(d) immersing said substrate including said bottom plate in boiling water for a time sufficient to oxidize the surface of said bottom plate thereby leaving said bottom plate covered with a first layer of oxide;
(e) depositing a second layer of aluminum on said one surface of said substrate including said first layer of oxide;
(f) immersing said substrate including said second layer of aluminum in boiling water for a time sufficient to oxidize all of said second layer of alumium thereby forming a second layer of oxide;
(g) baking said substrate at about 400° C. in an air atmosphere for about one-half hour;
(h) depositing a second insulating layer on said second layer of oxide;
(i) depositing a third layer of aluminum on said second insulating layer;
(j) removing a portion of said third layer of aluminum thereby forming the top plate and top plate contact of a capacitor; and
(k) removing the portion of said first and second oxide layers and said second insulating layer not covered by said capacitor top plate and top plate contact, thereby uncovering said bottom plate contact.

5. The method as defined in claim 4 wherein said first and second insulating layers are silicon oxide.

6. The method as defined in claim 4 wherein said substrate is a semiconductor.

7. The method as defined in claim 4 wherein steps (e) and (f) are repeated as often as necessary to form any desired thickness of oxide.

8. A method of making insulated cross-overs for the interconnection of a monolithic integrated circuit comprising the steps of:

(a) depositing a first layer of aluminum on one surface of a substrate;

(b) removing a portion of said first layer of aluminum thereby forming a first interconnection;

(c) immersing said substrate including said first interconnection in boiling water for a time sufficient to oxidize the surface of said first interconnection thereby leaving said first interconnection covered with a first layer of oxide;

(d) depositing a second layer of aluminum on said first layer of oxide and the remainder of said one surface of said substrate;

(e) immersing said substrate including said second layer of aluminum in boiling water for a time sufficient to oxidize all of said second layer of aluminum thereby forming a second layer of oxide;

(f) baking said substrate at about 400° C. in an air atmosphere for about one-half hour;

(g) depositing an insulating layer on said substrate including said second layer of oxide;

(h) depositing a third layer of aluminum on said second layer of oxide;

(i) removing a portion of said third layer of alumium thereby forming a second interconnection; and (j) removing the portion of said first and second oxide layers and said insulating layer not covered by said second interconnection, thereby uncovering said first interconection.

9. In the method as defined in claim 8 wherein said insulating layer is silicon oxide.

10. In the method as defined in claim 8 wherein steps (d) and (e) are repeated any number of times, thereby forming any desired thickness of oxide.

11. A method of making insulated cross-overs on the insulated surface of a semiconductor substrate containing a monolithic integrated circuit comprising the steps of:

(a) depositing a first layer of aluminum on said insulating surface;

(b) removing a portion of said first layer of aluminum thereby forming a first interconnection;

(c) immersing said substrate including said first interconnection in boiling water for a time sufficient to oxidize the surface of said first interconnection thereby leaving said first interconnection covered with a first layer of oxide;

(d) depositing a second layer of aluminum on said first layer of oxide and the remainder of said one surface of said substrate;

(e) immersing said substrate including said second layer of aluminum in boiling water for a time sufficient to oxidize all of said second layer of aluminum thereby forming a second layer of oxide;

(f) baking said substrate at about 400° C. in an air atmosphere for about one-half hour;

(g) depositing an insulating layer on said substrate including said second layer of oxide;

(h) depositing a third layer of aluminum on said second layer of oxide;

(i) removing a portion of said third layer of aluminum thereby forming a second interconnection; and (j) removing the portion of said first and second oxide layers and said insulating layer not covered by said second interconnection, thereby uncovering said first interconnection.

12. The method as defined in claim 11 wherein said insulating layer is silicon oxide.

References Cited

UNITED STATES PATENTS

| | | | |
|---|---|---|---|
| 2,753,616 | 7/1956 | Tognola | 29—25.42 |
| 3,138,744 | 6/1964 | Kilby | 29—577 |
| 3,169,892 | 2/1965 | Lemelson | 29—577 |
| 3,264,709 | 8/1966 | Lupfer | 29—25.42 |
| 3,273,033 | 9/1966 | Rossmeisl | 29—25.42 XR |

OTHER REFERENCES

"The Structure and Property of Materials," vol. 1, by William G. Moffatt et al., pp. 112–114.

JOHN F. CAMPBELL, Primary Examiner

R. B. LAZARUS, Assistant Examiner

U.S. Cl. X.R.

29—577; 317—258